(12) United States Patent
Xu et al.

(10) Patent No.: US 12,471,706 B2
(45) Date of Patent: Nov. 18, 2025

(54) BALL BEARING SLIDE

(71) Applicant: WUXI HAIDAER PRECISION SLIDES CO., LTD, Jiangsu (CN)

(72) Inventors: Xinglong Xu, Jiangsu (CN); Haiwen Zhang, Jiangsu (CN); Lian Zou, Jiangsu (CN); Feng Qian, Jiangsu (CN); Kai Dai, Jiangsu (CN); Qiang Ji, Jiangsu (CN)

(73) Assignee: WUXI HAIDAER PRECISION SLIDES CO., LTD, Jiangsu (CN)

( * ) Notice: Subject to any disclaimer, the term of this patent is extended or adjusted under 35 U.S.C. 154(b) by 396 days.

(21) Appl. No.: 18/028,188

(22) PCT Filed: Sep. 25, 2020

(86) PCT No.: PCT/CN2020/117619
§ 371 (c)(1),
(2) Date: Mar. 23, 2023

(87) PCT Pub. No.: WO2022/061687
PCT Pub. Date: Mar. 31, 2022

(65) Prior Publication Data
US 2025/0280953 A1   Sep. 11, 2025

(51) Int. Cl.
*F16C 29/04* (2006.01)
*A47B 88/487* (2017.01)
*A47B 88/493* (2017.01)

(52) U.S. Cl.
CPC .......... *A47B 88/487* (2017.01); *A47B 88/493* (2017.01); *F16C 29/04* (2013.01);
(Continued)

(58) Field of Classification Search
CPC ................ A47B 88/487; A47B 88/493; A47B 2210/00325; A47B 2210/0035;
(Continued)

(56) References Cited

U.S. PATENT DOCUMENTS 4,752,142 A * 6/1988 Jackson .................. F16C 29/04
384/18
2009/0195131 A1* 8/2009 Chi ....................... A47B 88/493
312/334.44

(Continued)

FOREIGN PATENT DOCUMENTS

CN   105508422 A    4/2016
TW   201300051 A  * 1/2013

*Primary Examiner* — Kimberley S Wright

(57) ABSTRACT

A ball bearing slide includes: at least one outer slide, an inner slide located within the outer slide, a ball cage located between the inner slide and the outer slide, and three rows of balls rollably arranged in the ball cage; wherein the three rows of the balls includes a first ball row, a second ball row, and a third ball row located between the first and second ball rows in a vertical direction; wherein the inner slide includes a first curved part against the first ball row, a second curved part against the second ball row, and a third curved part against the third ball row. With the first, second and third curved parts, internal space of the ball bearing slide for containing the inner slide is increased, which rationalizes the ball cage arrangement and optimizes the ball bearing slide design.

10 Claims, 8 Drawing Sheets

(52) U.S. Cl.
CPC .... *F16C 29/048* (2013.01); *A47B 2210/0032* (2013.01); *A47B 2210/0035* (2013.01); *A47B 2210/0056* (2013.01)

(58) Field of Classification Search
CPC .... A47B 2210/0032; A47B 2210/0056; A47B 2210/0059; A47B 2210/004; F16C 29/005; F16C 29/04; F16C 29/048; F24C 15/168
See application file for complete search history.

(56) References Cited

U.S. PATENT DOCUMENTS

| | | | | |
|---|---|---|---|---|
| 2011/0241515 | A1* | 10/2011 | Park | A47B 88/487 |
| | | | | 384/23 |
| 2011/0297009 | A1* | 12/2011 | Reidt | A47B 88/487 |
| | | | | 384/50 |
| 2013/0336602 | A1* | 12/2013 | Jahrling | F24C 15/168 |
| | | | | 384/49 |
| 2015/0159415 | A1* | 6/2015 | Rehage | E05D 15/0621 |
| | | | | 16/95 R |
| 2016/0167098 | A1* | 6/2016 | Weng | A47B 88/437 |
| | | | | 72/199 |
| 2018/0320738 | A1* | 11/2018 | Xu | A47B 88/493 |
| 2021/0068540 | A1* | 3/2021 | Lee | A47B 88/493 |

* cited by examiner

BALL BEARING SLIDE

BACKGROUND OF THE PRESENT INVENTION

Field of Invention

The present invention relates to a ball bearing slide, and more particularly to a hidden ball bearing slide that can adapt to a small installation space.

Description of Related Arts

In a conventional three-row ball bearing slide, such as the pulling guide device disclosed in Chinese patent CN103096756B, the inner slide is placed in at least one outer slide and is supported by three rows of supporting balls which are arranged in parallel along the length direction. The three rows of supporting balls are restricted within the length of the outer slide by ball cages. In a cross section of the outer slide, the three rows of supporting balls are positioned at three adjacent inner corners of the outer slide by the ball cage, so that the ball centers of the three rows of supporting balls are distributed as a right-angle triangle. Usually, the three rows of supporting balls can steadily support the inner slide in the outer slide, so as to effectively reduce the wobble gap of the inner slide, and prevent the inner slide from radial wobble in the cross section of the outer slide. Therefore, the conventional three-row ball bearing slides are mostly used in large capacity drawers or pull-out baskets of furniture and household appliances such as refrigerators, ovens, dishwashers, and other furniture to ensure the stability during opening or closing the drawer or basket. However, in practice, bearing capacity the conventional three-row ball bearing slide may be insufficient. When the drawer or basket is too long or heavily loaded, especially when the outer slide bears a large pressure or tension which is perpendicular to the outer slide plane, the curved surfaces of the inner slide that are contacted and supported by the three rows of supporting balls can easily be deformed due to uneven force. Under serious cases, this will lead to jamming of the drawer or basket. Furthermore, the conventional three-row ball bearing slide has a large size, and thus cannot adapt to the small space for hidden slide installation.

Therefore, it is really necessary to provide a novel ball bearing slide to overcome the above defects.

SUMMARY OF THE PRESENT INVENTION

An object of the present invention is to provide a ball bearing slide that adapts to a small space for hidden slide installation.

Accordingly, in order to accomplish the above object, the present invention provides a ball bearing slide, comprising: at least one outer slide, an inner slide located within the outer slide, a ball cage located between the inner slide and the outer slide, and three rows of balls rollably arranged in the ball cage; wherein the inner slide is supported by the balls to slide relative to the outer slide along an arrangement direction of the three rows of the balls; the outer slide comprises a bottom wall, as well as a long wall portion and a short wall portion which are formed by integrally extending both sides of the bottom wall and are arranged along a length direction of the bottom wall; the three rows of the balls comprises a first ball row and a second ball row contacting an interior side of the long wall portion, and a third ball row contacting an interior side of the short wall portion and located between the first ball row and the second ball row in a vertical direction; wherein the inner slide comprises a first curved part against a curved surface of the first ball row facing the inner slide, a second curved part against a curved surface of the second ball row facing the inner slide, and a third curved part against a curved surface of the third ball row facing the inner slide; the third curved part is located between the first ball row and the second ball row in the vertical direction, and is symmetrically arranged relative to a symmetry axis of a line connecting centers of the first ball row and the second ball row.

Preferably, the third curved part has a bottom side in a width direction perpendicular to the vertical direction; the inner slide has a central axis C-C extending in the vertical direction and passing through a central point of the inner slide; and the bottom side exceeds the central axis C-C in the width direction.

Preferably, the ball cage comprises a fourth holding portion corresponding to the short wall portion for holding the third ball row, wherein the fourth holding portion extends flatly along the vertical direction.

Preferably, the ball cage further comprises a first holding portion for holding the first ball row, a third holding portion for holding the second ball row, and a first connecting portion connecting the first holding portion and the third holding portion; wherein the first connecting portion extends flatly along the vertical direction, and a portion of the long wall portion corresponding to the first connecting portion also extends flatly along the vertical direction.

Preferably, the outer slide further comprises: a first support formed at an end of the long wall portion and having a curved internal contour, a second support formed at an end of the short wall portion and having a curved internal contour, a first corner corresponding to the first support and vertically arranged at a top of the long wall portion, a second corner corresponding to the second support and vertically arranged at a top of the short wall portion, and a connecting wall connecting the first corner and the second corner; wherein the first holding portion of the ball cage is arranged corresponding to the first corner, a second holding portion of the ball cage is arranged corresponding to the second corner, the third holding portion is arranged corresponding to the first support, and the fourth holding portion is arranged corresponding to the second support; the first ball row is restricted by the first holding portion corresponding to the first corner portion, the second ball row is restricted by the third holding part corresponding to the first support, and the third ball row is restricted by the fourth holding part corresponding to the second support.

Preferably, an angle of an internal contour of the third curved part is 100°-110° for holding the third ball row.

Preferably, the inner slide further comprises a second convex part connecting the second curved part and the third curved part, wherein the second convex part is formed by folding and bending a portion between the first curved part and the third curved part and rolling the part at an angle towards the second holding portion; the second convex part is located between the first ball row and the third ball row.

Preferably, a thickness of the second convex part equals a distance between the first ball row and the third ball row, a dimension of the second convex part is smaller than a total thickness of two rolled raw materials of the inner slide.

Preferably, the second convex part is spaced from the second holding portion with a second spacing therebetween; one side of the second convex part, which faces the second holding portion, is rolled into a flat surface to place the ball cage.

Preferably, the inner slide further comprises a first convex part connecting the first curved part and the second curved part, which corresponds to a position of the third curved part, wherein the bottom side of the third curved part is pressed inwardly towards the first convex part; the first convex part is formed by folding and bending a portion between the first curved portion and the second curved portion.

Preferably, the first convex part is located between the first ball row and the second ball row; the first convex part is spaced from the first connecting part in a width direction with a first spacing therebetween; one side of the first convex part, which faces the first connecting portion, is rolled into a flat surface to place the ball cage.

Preferably, a tail portion of the third curved part is cocked towards the third ball row; a tangent line of the tail portion of the third curved part and a tangent line of the short wall portion together form an opening with a first angle; an end of the fourth holding portion extends out through the opening.

According to the ball bearing slide of the present invention, the first curved part, the second curved part and the third curved part are designed on the inner slide, the first convex part is located between the first curved part and the second curved part, and the second convex part is located between the second curved part and the third curved part. As a result, the third curved part presses towards the interior side to exceed the other side of the central axis of the ball bearing slide. At the same time, by rolling the first convex part and the second convex part, a sufficient internal space is generally provided in the ball cage, so as to rationalize the arrangement of the ball cage and improve the overall bearing capacity of the ball bearing slide.

DETAILED DESCRIPTION OF THE PREFERRED EMBODIMENT

Figure 1:
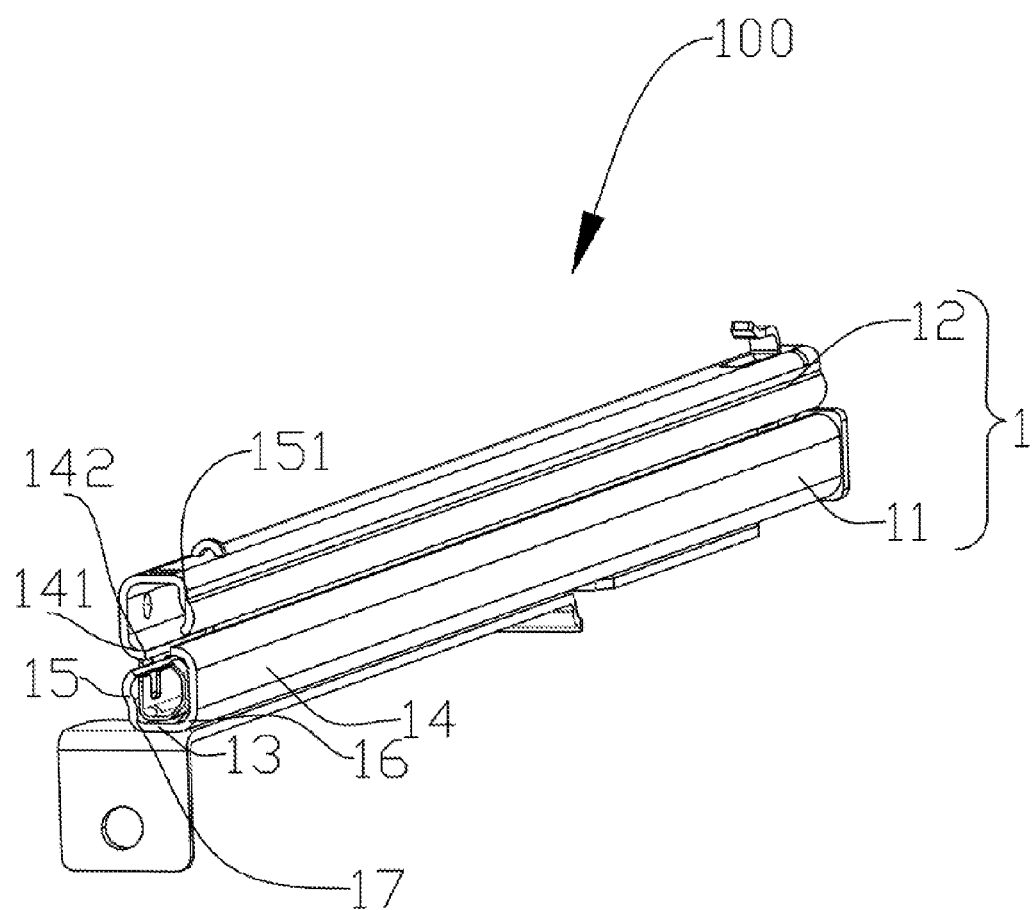
FIG. 1 is a perspective view of a ball bearing slide of the present invention.
Figure 2:
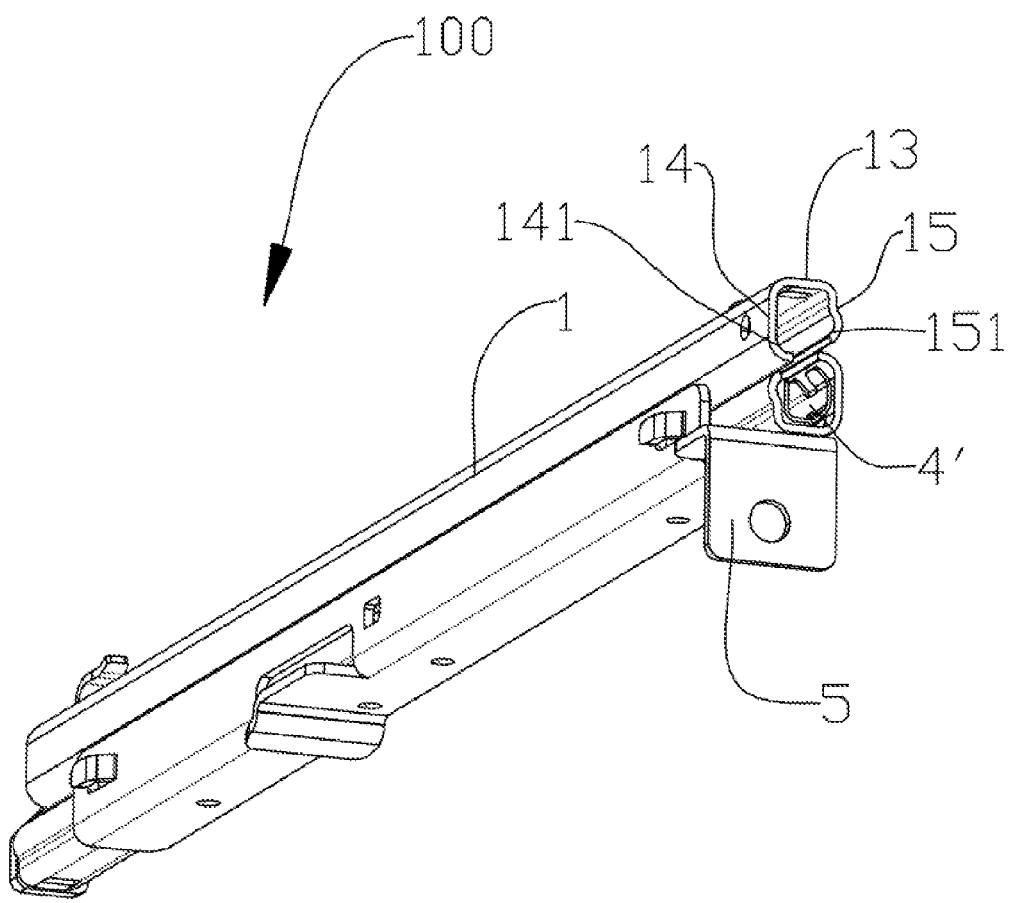
FIG. 2 is viewed from another direction of FIG. 1.
Figure 3:
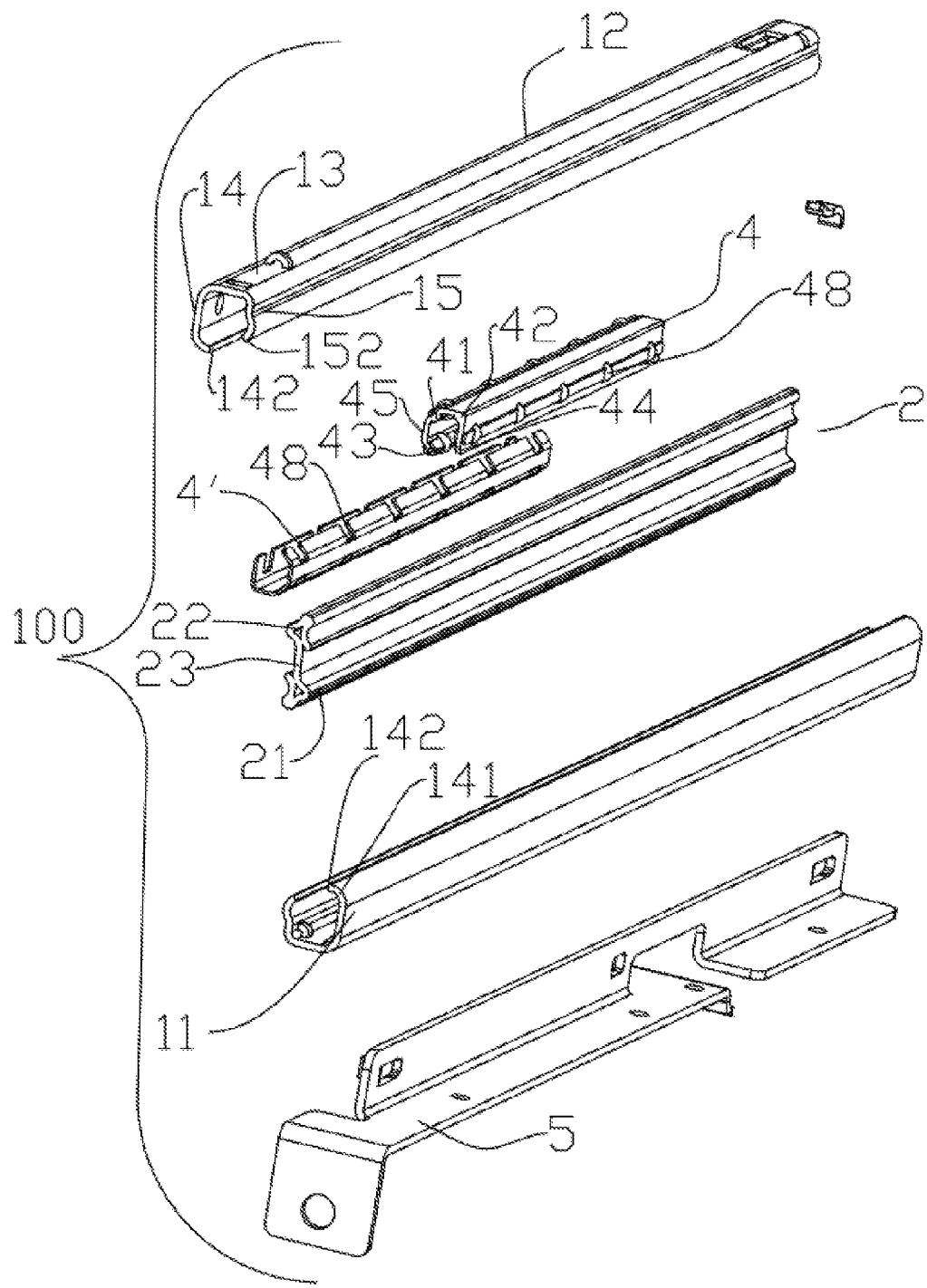
FIG. 3 is an exploded view of the ball bearing slide of the present invention.
Figure 4:
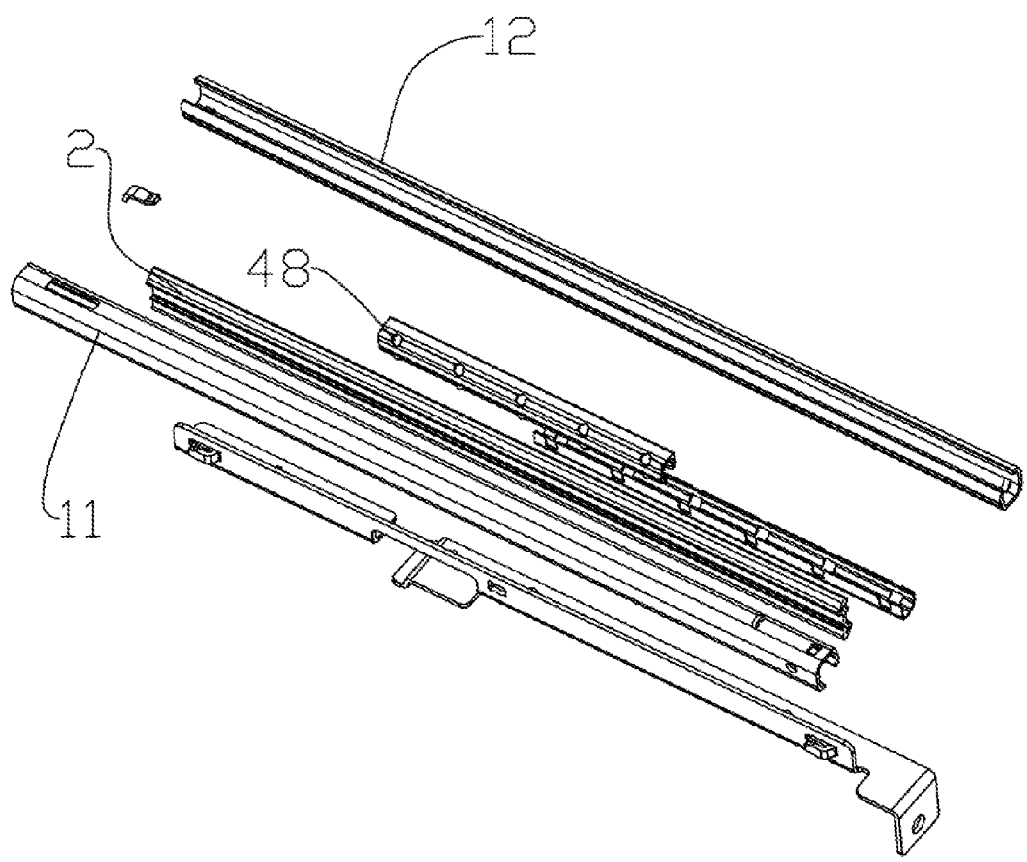
FIG. 4 is viewed from another direction of FIG. 3.
Figure 5:
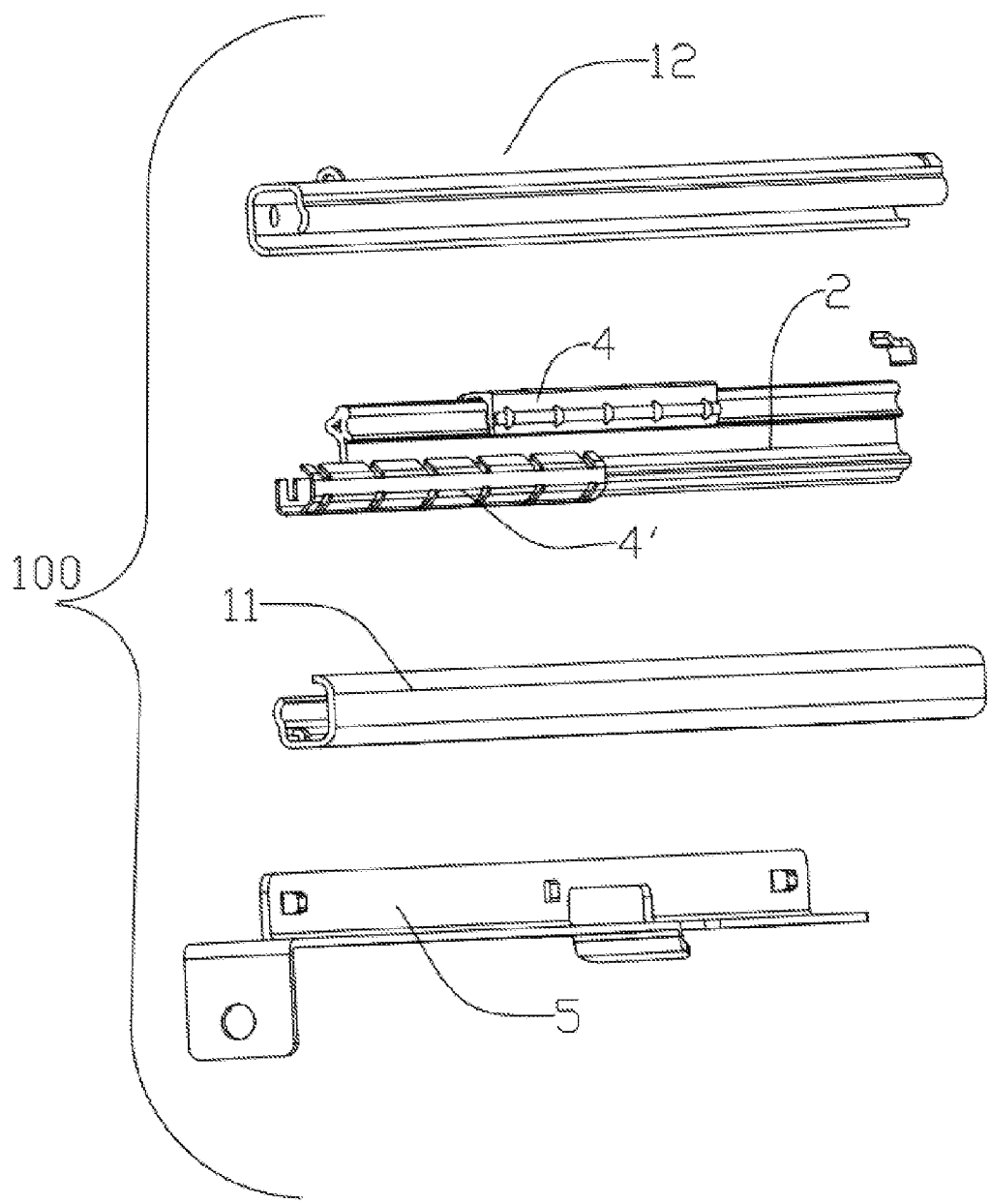
FIG. 5 is a partially exploded view of the ball bearing slide of the present invention.
Figure 6:
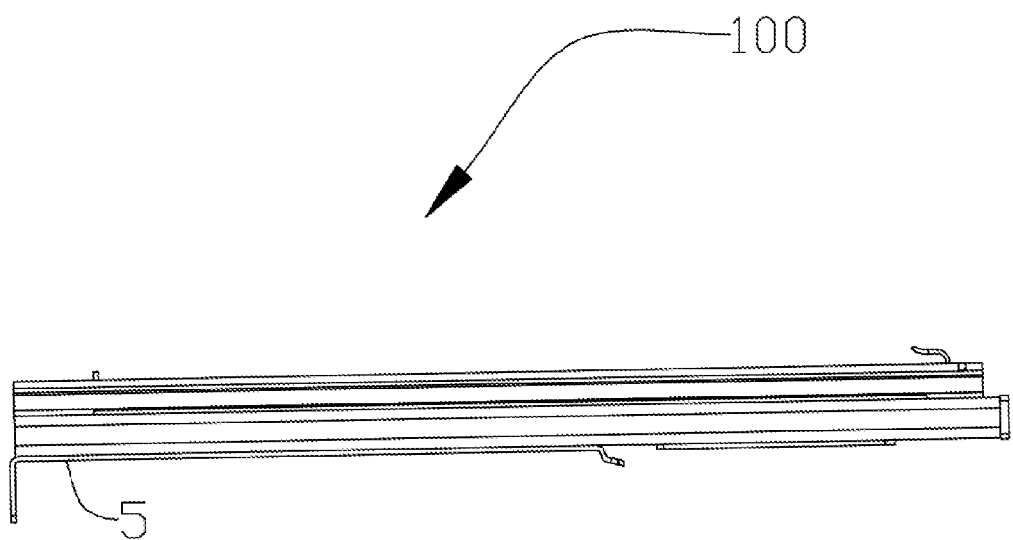
FIG. 6 is a front elevational view of the ball bearing slide of the present invention.
Figure 7:
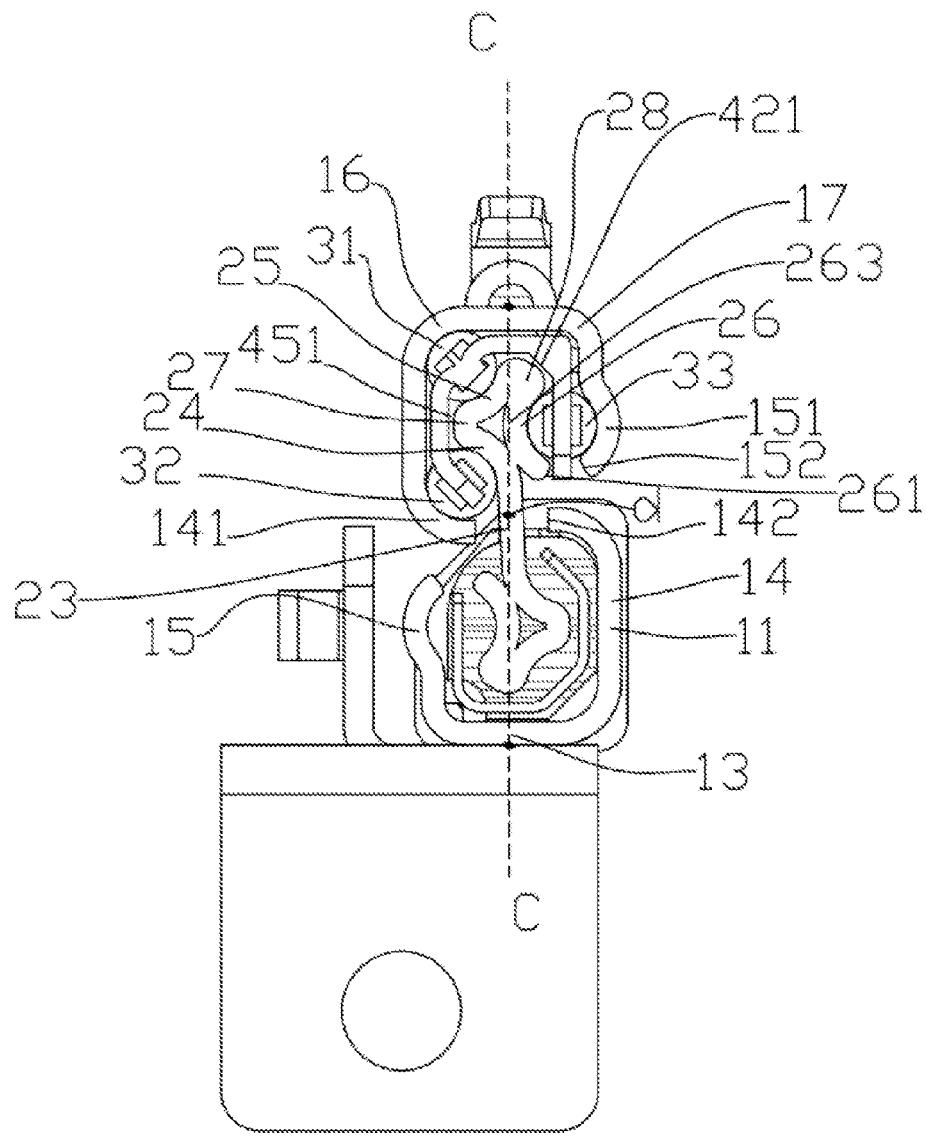
FIG. 7 is a cross-sectional view of the ball bearing slide of the present invention.
Figure 8:
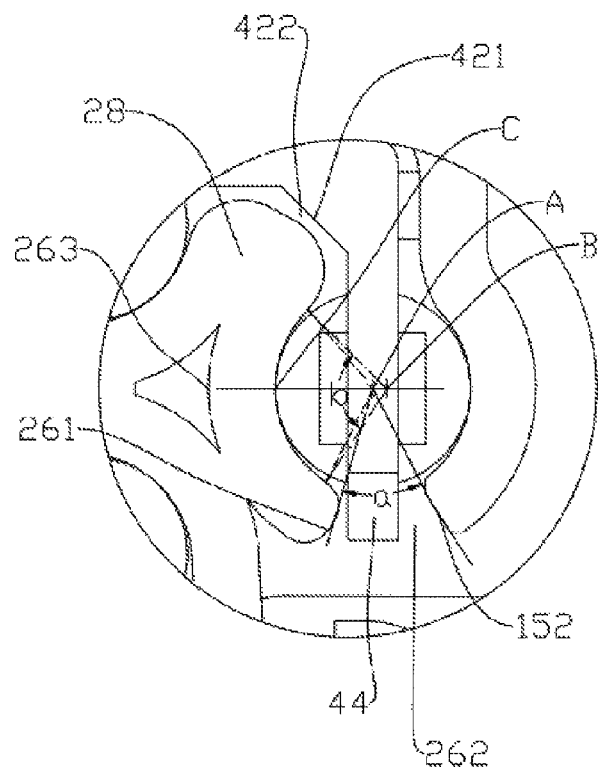
FIG. 8 is a partially enlarged view of FIG. 7.

In the description of the present invention, it should be noted that the terms "upper", "lower", "inner", "outer", etc. indicate orientation or positional relationships that are based on the orientation or positional relationships shown in the accompanying drawings and are intended only to facilitate and simplify the description of the present invention. Such terms are not intended to indicate or imply that the device or component referred to must have a particular orientation or be constructed and operated in a particular orientation. Therefore, such terms cannot be construed as limiting the present invention.

In the description of the present invention, it should be noted that unless otherwise expressly specified and limited, the term "connection" should be understood in a broad sense. To persons of ordinary skill in the art, the specific meaning of the above terms in the context of the present invention can be understood according to specific situations.

Hereinafter, the ball bearing slide 100 of the present invention will be described in conjunction with FIGS. 1-9.

A ball bearing slide 100 is provided, comprising: at least one outer slide 1, an inner slide 2 located within the outer slide 1, a ball cage 4 located between the inner slide 2 and the outer slide 1, and three rows of balls 3 rollably arranged in the ball cage 4. According to the embodiment, there are two outer slides 1, namely a first outer slide 11 and a second outer slide 12 symmetric to the first outer slide 11. The first outer slide 11 is fixed to a cabinet of furniture or home appliance by a fixing bracket 5, and the second outer slide 12 is fixed to an external wall of a drawer. The inner slide 2 is supported in the outer slide 1 by the three rows of the balls 3 set in parallel along a length direction, and the three rows of the balls 3 are limited by the ball cage 4 within a length of the outer slide 1. The inner slide 2 is supported by the balls 3 to translate along the outer slide 1. The ball cage 4 has three grooves matching the three rows of the balls, and one groove restricts one row of the balls 3. Slots 48 are spaced on each of the three grooves for holding and restricting the balls 3.

Referring to FIGS. 1-9, the first outer slide 11 and the second outer slide 12 have the same structure, and the second outer slide 12 will be illustrated as an example. The outer slide 1 comprises a bottom wall 13 fixed with the fixing bracket 5, as well as a long wall portion 14 and a short wall portion 15 which are formed by integrally extending both sides of the bottom wall 13 and are arranged along a length direction of the bottom wall 13. The outer slide 1 further comprises: a first support 141 formed at an end of the long wall portion 14 and having a curved internal contour, a second support 151 formed at an end of the short wall portion 15 and having a curved internal contour, a first corner 16 corresponding to the first support 141 and vertically arranged at a top of the long wall portion 14, a second corner 17 corresponding to the second support 151 and vertically arranged at a top of the short wall portion 15, and a connecting wall 18 connecting the first corner 16 and the second corner 17. An end of the first support 141 is defined as a first end 142, and an end of the second support 151 is defined as a second end 152.

According to the embodiment, there are two ball cages 4, one ball cage 4 corresponds to one outer slide 1. The ball cage 4 is positioned relative to the inner slide 2. If the ball bearing slide 100 is applied in heat resistant or harsh environments such as microwave oven, the ball cage 4 is made of steel material; and if the ball bearing slide 100 is applied in environments such as drawer furniture, the ball cage 4 is made of plastic material. The ball cage 4 comprises a first holding portion 41 for holding the first ball row 31, a second holding portion 42 corresponding to the second corner 17, a third holding portion 43 for holding the second ball row 32, and a fourth holding portion 44 corresponding to the short wall portion 15 for holding the third ball row 33, wherein the fourth holding portion 44 extends flatly along the vertical direction. The first holding portion 41 is arranged corresponding to the first corner 16, the third holding portion 43 is arranged corresponding to the first support 141, and the fourth holding portion 44 is arranged corresponding to the second support 151. The first ball row 31 is restricted by the first holding portion 41 corresponding to the first corner portion 16, the second ball row 32 is restricted by the third holding part 43 corresponding to the first support 141, and the third ball row 33 is restricted by the fourth holding part 44 corresponding to the second support 151. The ball cage 4 further comprises a first connecting portion 45 arranged in the vertical direction and connecting the first holding portion 41 and the third holding portion 43, a second connecting portion 46 arranged in a width direction of the ball bearing slide 100 and connecting the first holding portion 41 and the second holding portion 42, and a third connecting portion 47 arranged in the vertical direction and connecting the second holding portion 42 and the fourth holding portion 44. The first connecting portion 45 extends flatly along the vertical direction, and a portion of the long wall portion 14 corresponding to the first connecting portion 45 also extends flatly along the vertical direction. The first connecting portion 45, the second connecting portion 46 and the third connecting portion 47 are provided with corresponding slots 48 for holding the balls 3.

The three rows of the balls 3 comprises a first ball row 31 and a second ball row 32 contacting an interior side of the long wall portion 14, and a third ball row 33 contacting an interior side of the short wall portion 15 and located between the first ball row 31 and the second ball row 32 in a vertical direction.

Figure 9:
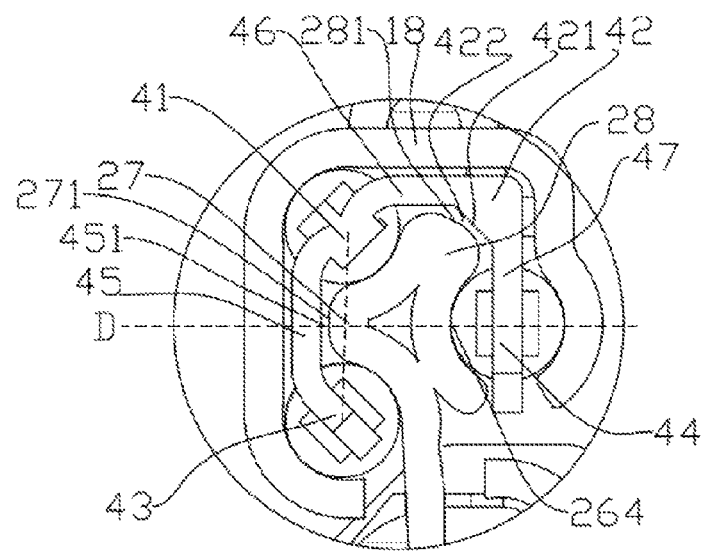
FIG. 9 is another partially enlarged view of FIG. 7.

Referring to FIGS. 1-8, the inner slide 2 is a roll formed steel plate of uniform thickness. The inner slide 2 comprises a first inner slide end 21 housed in the first outer slide 11, a second inner slide end 22 housed in the second outer slide 12, and a connecting wall 23 between the first inner slide end 21 and second inner slide end 22. The connecting wall 23 is tilted at a certain angle to reasonably configure the long wall part 14 and the short wall part 15 of the first outer slide 11 and second outer slide 12 on each side in a staggered form, thus reducing the size of the ball bearing slide 100 in the height direction as much as possible. The first inner slide end 21 and the second inner slide end 22 have the same structure and are arranged in a central symmetry form. The second inner slide end 22, for example, comprises a first curved part 24 against a curved surface of the first ball row 31 facing the inner slide 2, a second curved part 25 against a curved surface of the second ball row 32 facing the inner slide 2, and a third curved part 26 against a curved surface of the third ball row 33 facing the inner slide 2. The third curved 26 and the short wall portion 15 hold the third ball row 33 from both sides thereof in the width direction. In the vertical direction, the third curved part 26 is located on a perpendicular line D of a line connecting centers of the first ball row 31 and the second ball row 32. According to a preferred embodiment, the third curved part 26 is symmetrical with respect to the perpendicular line D (see FIG. 9). A center point of the inner slide 2 is d (see FIG. 7), and an axis extending in the vertical direction through the point d is defined as a central axis C-C. The third curved part 26 has a bottom side 263 and an interior side 264 in the width direction, wherein the bottom side 263 exceeds the central axis C-C of the ball bearing slide 100 in a thickness direction. A contour of the interior side 264 of the third curved part 26 has an angle b. Referring to FIG. 9, point A is a center of circle of the third ball row 33, point B is a center of circle of the interior side 264 of the third curved part 26, and point C is a contact point between the third ball row 33 and the interior side 264. The points A, B and C are located in the same straight line, and the angle b is a curved angle of the third curved part 26. The angle b ranges from 100 degrees to 110 degrees and can be 100 degrees or 110 degrees. According to the preferred embodiment, the angle b is 110 degrees, while in other embodiments, the angle can be more than 110 degrees and less than 180 degrees. Here the angle is an obtuse angle. When a top surface of the second outer slide 12 receives an external pressure, the third ball row 33 can transmit the pressure to the second inner slide end 22, and the third curved part 26 can bear the pressure in the vertical direction on an obtuse angle contact surface, so as to reasonably and uniformly distribute the bearing forces of the third ball row 33 and the inner slide 2. A tail portion 261 of the third curved part 26 is cocked towards the third ball row 33, and an interior side of the tail portion 261 is maintained with a curved profile. A tangent line of a center point of the third ball row 33 at an end of the tail portion 261 of the third curved part 26 and a tangent line of the short wall portion 15 together form an opening 262 with a first angle a. The first angle a can be adjusted according to a thickness of the ball cage 4 to allow the ball cage 4 to extend from an opening range of the angle a, which is conducive to the effective support of the ball cage 4 and the overall stability of the ball cage 4.

The inner slide 2 further comprises a first convex part 27 connecting the first curved part 24 and the second curved part 25, which corresponds to a position of the third curved part 26; and a second convex part 28 connecting the second curved part 25 and the third curved part 26. The first convex part 27 is formed by folding and bending a portion between the first curved portion 24 and the second curved portion 25. The second convex part 28 is formed by folding and bending a portion between the first curved part 24 and the third curved part 26 and rolling the part at an angle towards the second holding portion 42. The bottom side 263 of the third curved part 26 is pressed inwardly towards the first convex part 27, so that the bottom side 263 of the third curved part 26 exceeds the other side of the central axis C, thereby compressing the thickness of the ball bearing slide as much as possible and making the long wall portion 14 as compact as possible. The first convex part 27 is located between the first ball row 31 and the second ball row 32; the first convex part 27 is spaced from the first connecting part 45 in a width direction with a first spacing 451 therebetween. One side of the first convex part 27, which faces the first connecting portion 45, is a flat portion 271, wherein the flat portion 271 is rolled into a flat surface to place the ball cage 4. The second convex part 28 is tilted towards the second holding portion 42 in the vertical direction, and can bear forces in both the vertical direction and the width direction according to a force direction of the outer slide 1. The second convex part 28 is located between the first ball row 31 and the third ball row 33. A thickness of the second convex part 28 equals a distance between the first ball row 31 and the third ball row 33; and dimension of the second convex part 28 is smaller than a total thickness of two rolled raw materials of the inner slide 2. Because the inner slide 2 squeezes a thickness of the second convex part 28 during roll-forming, making the raw material elongated, which in turn allows the spacing between the first ball row 31 and the third ball row 33 to be smaller than the total thickness of two materials. As a result, the size of the ball bearing slide 100 is comprehensively reduced in the thickness direction. The second convex part 28 is spaced from the second holding portion 42 with a second spacing 422 therebetween. The second holding portion 42 has an internal wall 421 which faces the second convex part 28, and the internal wall 421 is a flat surface. One side of the second convex part 28, which faces the internal wall 421, is rolled into a flat surface 281 to place the ball cage 4. When rolling the inner slide 2, restriction mold surfaces are added to the flat portion 271 of the first convex part 27 and the flat surface 281 of the second convex part 28, and thus avoid material flow excessive extension of the convex parts 27 and 28 caused by excessive extrusion during rolling. The material flow excessive extension will reduce the design space of the ball cage 4, resulting in the need of corresponding transition part for the ball cage 4, which in turn makes the ball cage 4 complex, and increases the size of the ball bearing slide 100 in the overall thickness direction.

The connecting wall 23 of the inner slide 2 is tilted because the third curved part 26 in the first outer slide 31 and the third curved part 26 in the second outer slide 32 are set back-to-back. Therefore, the long wall portion 14 should be correspondingly arranged at the side with the third curved part 26, and the short wall portion 15 should be arranged at the opposite position. In order to compress the overall height of the ball bearing slide as much as possible, the long wall portion 14 should cooperate with the short wall portion 15.

The inner slide 2 of the present invention is designed to have the first curved part 24, the second curved part 25 and the third curved part 26 at corresponding positions, as well as the first convex part 27 and the second convex part 28 located between the ball rows 31, 32 and 33. A radian of the third curved part 26 should be obtuse curved surface as far as possible, and the third curved part 26 should be symmetrically arranged relative to the symmetry axis of the line connecting the centers of the ball rows 31 and 32, so that forces along the height direction of the ball bearing slide 100 can be uniformly received in the curved surface, which improves the overall bearing capacity of the ball bearing slide 100. Both the first convex part 27 and the second convex part 28 have flat surfaces to make as much room as possible for the design space of the ball cage 4, which effectively compresses the overall height and width of the ball bearing slide 100. The third curved part 26 is set along the symmetry axis of the line connecting the centers of the ball rows 31 and 32, and towards them as close as possible, so that the thickness of the second convex part 28 located between the first ball row 31 and the third ball row 33 is rolled and compressed as much as possible, and the spacing therebetween is less than the total thickness of two material thicknesses of the inner slide 2.

With the foregoing design, the overall thickness of the ball bearing slide 100 is directly reduced, so that the design of the inner slide 2 can fully save the space between the outer slides 1, thus leaving enough room for the ball cage 4 and making full use of the space within the outer slide 1. In general, sufficient internal space of the ball cage 4 is ensured, which rationalizes the ball cage arrangement and improves the overall bearing capacity of the ball bearing slide.

Finally, it should be noted that the above embodiments are used only to illustrate the technical solution of the present invention and not to limit it. Despite the detailed description of the present invention with reference to the foregoing embodiments, it should be understood by those of ordinary skill in the art that it is still possible to modify the technical solution recorded in the foregoing embodiments or to make equivalent substitutions for part or all of the technical features thereof. Such modifications or substitutions do not make the essence of the corresponding technical solution different from those in the embodiments of the present invention.

The above description is only part of all embodiments of the present invention. Any equivalent changes to the technical solution of the present invention made by those skilled in the art after reading the specification are covered by the following claims.

What is claimed is:

1. A ball bearing slide, comprising: at least one outer slide (1), an inner slide (2) located within the outer slide (1), a ball cage (4) located between the inner slide (2) and the outer slide (1), and three rows of balls (3) rollably arranged in the ball cage (4); wherein the inner slide (2) is supported by the balls (3) to slide relative to the outer slide (1) along an arrangement direction of the three rows of the balls (3); the outer slide (1) comprises a bottom wall (13), as well as a long wall portion (14) and a short wall portion (15) which are formed by integrally extending both sides of the bottom wall (13) and are arranged along a length direction of the bottom wall (13); the three rows of the balls (3) comprises a first ball row (31) and a second ball row (32) contacting an interior side of the long wall portion (14), and a third ball row (33) contacting an interior side of the short wall portion (15) and located between the first ball row (31) and the second ball row (32) in a vertical direction; wherein the inner slide (2) comprises a first curved part (24) against a curved surface of the first ball row (31) facing the inner slide (2), a second curved part (25) against a curved surface of the second ball row (32) facing the inner slide (2), and a third curved part (26) against a curved surface of the third ball row (33) facing the inner slide (2); the third curved part (26) is located between the first ball row (31) and the second ball row (32) in the vertical direction, and is symmetrically arranged relative to a symmetry axis of a line connecting centers of the first ball row (31) and the second ball row (32);
   wherein the third curved part (26) has a bottom side (263) in a width direction perpendicular to the vertical direction; the inner slide (2) has a central axis C-C extending in the vertical direction and passing through a central point of the inner slide (2); and the bottom side (263) exceeds the central axis C-C in the width direction;
   wherein a tail portion (261) of the third curved part (26) is cocked towards the third ball row (33); a tangent line of the tail portion (261) of the third curved part (26) and a tangent line of the short wall portion (15) together form an opening (262) with a first angle (a); an end of a fourth holding portion (44) extends out through the opening (262).

2. The ball bearing slide, as recited in claim 1, wherein the ball cage (4) comprises a fourth holding portion (44) corresponding to the short wall portion (15) for holding the third ball row (33), wherein the fourth holding portion (44) extends along the vertical direction.

3. The ball bearing slide, as recited in claim 2, wherein the ball cage (4) further comprises a first holding portion (41) for holding the first ball row (31), a third holding portion (43) for holding the second ball row (32), and a first connecting portion (45) connecting the first holding portion (41) and the third holding portion (43); wherein the first connecting portion (45) extends along the vertical direction, and a portion of the long wall portion (14) corresponding to the first connecting portion (45) also extends along the vertical direction.

4. The ball bearing slide, as recited in claim 3, wherein the outer slide (1) further comprises: a first support (141) formed at an end of the long wall portion (14) and having a curved internal contour, a second support (151) formed at an end of the short wall portion (15) and having a curved internal contour, a first corner (16) corresponding to the first support (141) and vertically arranged at a top of the long wall portion (14), a second corner (17) corresponding to the second support (151) and vertically arranged at a top of the short wall portion (15), and a connecting wall (18) connecting the first corner (16) and the second corner (17); wherein the first holding portion (41) of the ball cage (4) is arranged corresponding to the first corner (16), a second holding portion (42) of the ball cage (4) is arranged corresponding to the second corner (17), the third holding portion (43) is arranged corresponding to the first support (141), and the fourth holding portion (44) is arranged corresponding to the second support (151); the first ball row (31) is restricted by the first holding portion (41) corresponding to the first corner portion (16), the second ball row (32) is restricted by the third holding portion (43) corresponding to the first support (141), and the third ball row (33) is restricted by the fourth holding part (44) corresponding to the second support (151).

5. The ball bearing slide, as recited in claim 1, wherein an angle of an internal contour of the third curved part (26) is no less than 100° while no more than 110° for holding the third ball row (33).

6. The ball bearing slide, as recited in claim 4, wherein the inner slide (2) further comprises a second convex part (28) connecting the second curved part (25) and the third curved part (26), wherein the second convex part (28) is formed by folding and bending a portion between the first curved part (24) and the third curved part (26) and rolling the part at an angle towards the second holding portion (42); the second convex part (28) is located between the first ball row (31) and the third ball row (33).

7. The ball bearing slide, as recited in claim 6, wherein a thickness of the second convex part (28) equals a distance between the first ball row (31) and the third ball row (33), a dimension of the second convex part (28) is smaller than a total thickness of two rolled raw materials of the inner slide (2).

8. The ball bearing slide, as recited in claim 5, wherein a second convex part (28) is spaced from a second holding portion (42) with a second spacing (422) therebetween; one side of the second convex part (28), which faces the second holding portion (42), is rolled into a flat surface to place the ball cage (4).

9. The ball bearing slide, as recited in claim 6, wherein the inner slide (2) further comprises a first convex part (27) connecting the first curved part (24) and the second curved part (25), which corresponds to a position of the third curved part (26), wherein the bottom side (263) of the third curved part (26) is pressed inwardly towards the first convex part (27); the first convex part (27) is formed by folding and bending a portion between the first curved portion (24) and the second curved portion (25).

10. The ball bearing slide, as recited in claim 7, wherein the first convex part (27) is located between the first ball row (31) and the second ball row (32); the first convex part (27) is spaced from the first connecting part (45) in a width direction with a first spacing (451) therebetween; one side of the first convex part (27), which faces the first connecting portion (45), is rolled into a flat surface to place the ball cage (4).

\* \* \* \* \*